United States Patent
Anderson

[11] Patent Number: 6,050,019
[45] Date of Patent: Apr. 18, 2000

[54] ROD AND REEL HOLDER WITH AUTOMATIC HOOK SETTER

[76] Inventor: Kenneth M. Anderson, 25108 Meadowlark Rd., Versailles, Mo. 65084

[21] Appl. No.: 09/039,674

[22] Filed: Mar. 16, 1998

[51] Int. Cl.$^7$ .................................................. A01K 91/06
[52] U.S. Cl. ................................................................ 43/15
[58] Field of Search ............................ 43/15, 16, 21.2

[56] References Cited

U.S. PATENT DOCUMENTS

| | | | |
|---|---|---|---|
| 975,822 | 11/1910 | Becker et al. | 43/16 |
| 1,488,838 | 4/1924 | Savoie | 43/15 |
| 2,703,465 | 3/1955 | Stefano | 43/15 |
| 2,744,351 | 5/1956 | Smith | 43/16 |
| 2,784,516 | 3/1957 | Barnes et al. | 43/16 |
| 2,804,277 | 8/1957 | Kinder | 43/16 |
| 2,944,361 | 7/1960 | Coulter | 43/16 |
| 2,964,868 | 12/1960 | Bennett | 43/15 |
| 3,271,891 | 9/1966 | Hancock | 43/15 |
| 3,407,527 | 10/1968 | Hill | 43/15 |
| 3,412,499 | 11/1968 | Pastrovich, Sr. | 43/15 |
| 3,798,821 | 3/1974 | Bybee | 43/15 |
| 3,897,646 | 8/1975 | Sheets | 43/15 |
| 4,159,589 | 7/1979 | Pendegraft | 43/15 |
| 4,231,178 | 11/1980 | Black | 43/16 |
| 4,235,035 | 11/1980 | Guthrie | 43/15 |
| 4,391,059 | 7/1983 | Cordova et al. | 43/15 |
| 4,397,113 | 8/1983 | Pinson | 43/15 |
| 4,471,553 | 9/1984 | Copeland | 43/15 |
| 4,676,018 | 6/1987 | Kimball | 43/15 |
| 4,730,408 | 3/1988 | Miller | 43/15 |
| 4,823,493 | 4/1989 | Gray | 43/15 |
| 5,076,001 | 12/1991 | Coon et al. | 43/15 |
| 5,363,582 | 11/1994 | Walker et al. | 43/15 |

Primary Examiner—Michael J. Carone
Assistant Examiner—Darren W. Ark

[57] ABSTRACT

This invention securely holds a fishing rod and reel in a variety of situations and automatically sets the fishing hook when a fish strikes the baited hook or lure. Adapters hold the vertical stand either on a pond bank, a boat or dock rail, or dock flooring. The vertical stand pivotally supports a rod and reel holder, which is configured to hold the fishing tackle securely and without damage. The fishing line is looped under the trigger lever, which is raised and rotated by the pull on the fishing line when a fish strikes the bait. The catch arm is released as the trigger lever is lifted. The rod and reel holder is spring loaded and pivots around the support point when the catch arm is released, thus snapping to a more upright position, which action sets the hook.

4 Claims, 3 Drawing Sheets

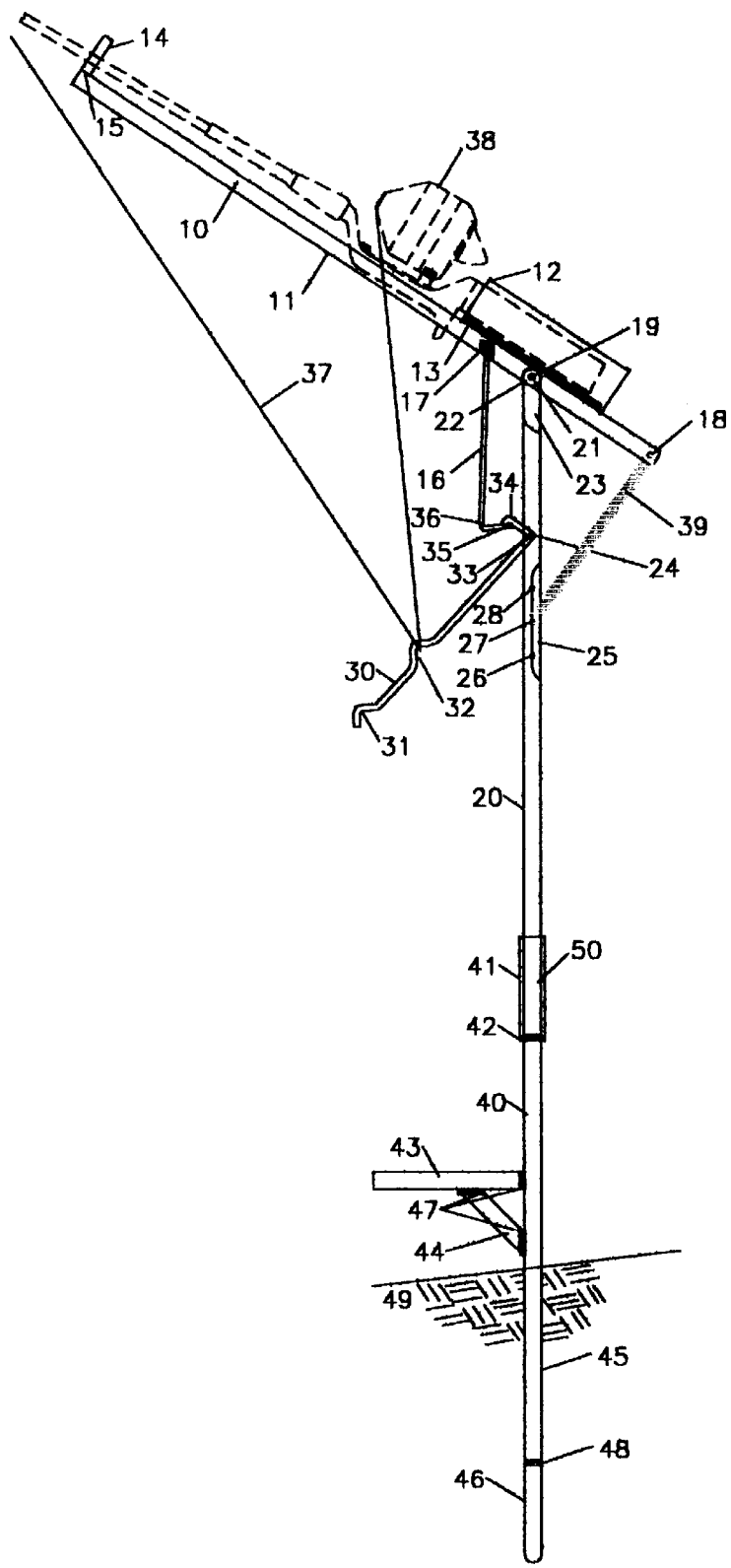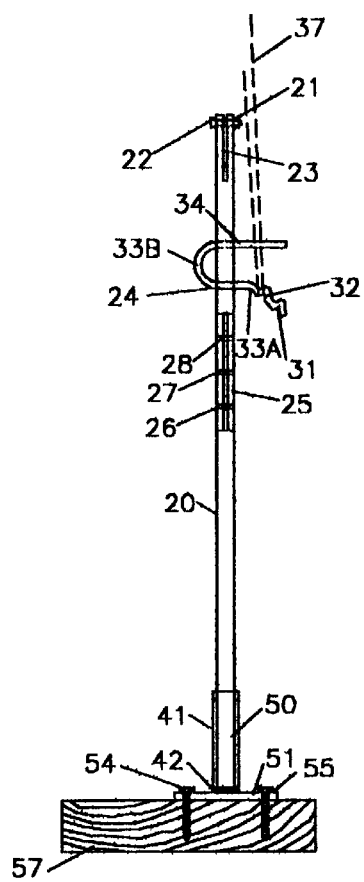
FIG. 1
FIG. 2

ROD AND REEL HOLDER WITH AUTOMATIC HOOK SETTER

BRIEF DESCRIPTION OF THE SEVERAL VIEWS OF THE DRAWING

FIG. 1 is a side view of a rod and reel holder with automatic book setter, with bank fishing adapter, shown in the "cocked" position.

FIG. 2 is a front view of only the support stand and trigger lever of a rod and reel holder with automatic hook setter, with base adapter screwed to wood dock plank, showing.

DETAILED DESCRIPTION OF THE INVENTION

Figure 3:
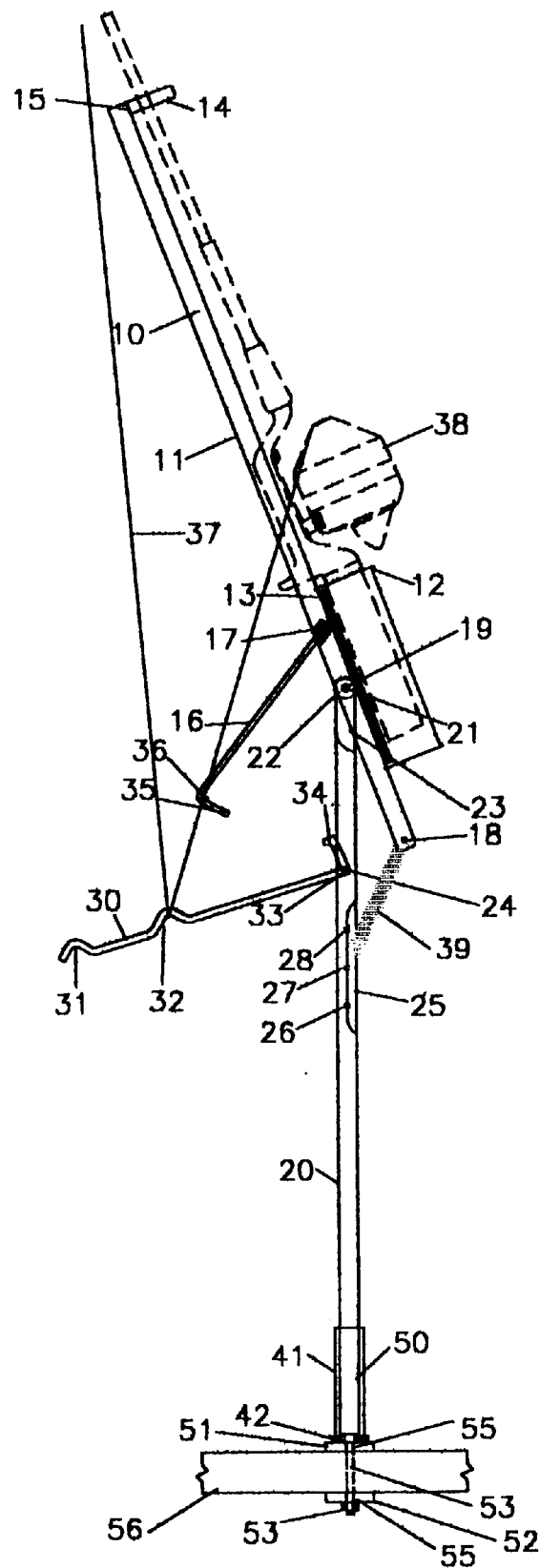
FIG. 3 is a side view of a rod and reel holder with automatic hook setter, with base adapter bolted to a boat railing, shown after release and full rotation of the rod and reel holder and tackle around the pivot point to set the hook.

Referring now to the drawings in more detail, the rod and reel holder with automatic hook setter includes the following main components: numeral 10 is the rod and reel holder assembly; numeral 20 is the support stand; numeral 30 is the trigger lever; numeral 40 is the base adapter for bank fishing; and numeral 50 is the base adapter for attaching the rod and reel holder with automatic hook setter to a boat railing or wooden dock plank. These main components are further described below.

Figure 4:
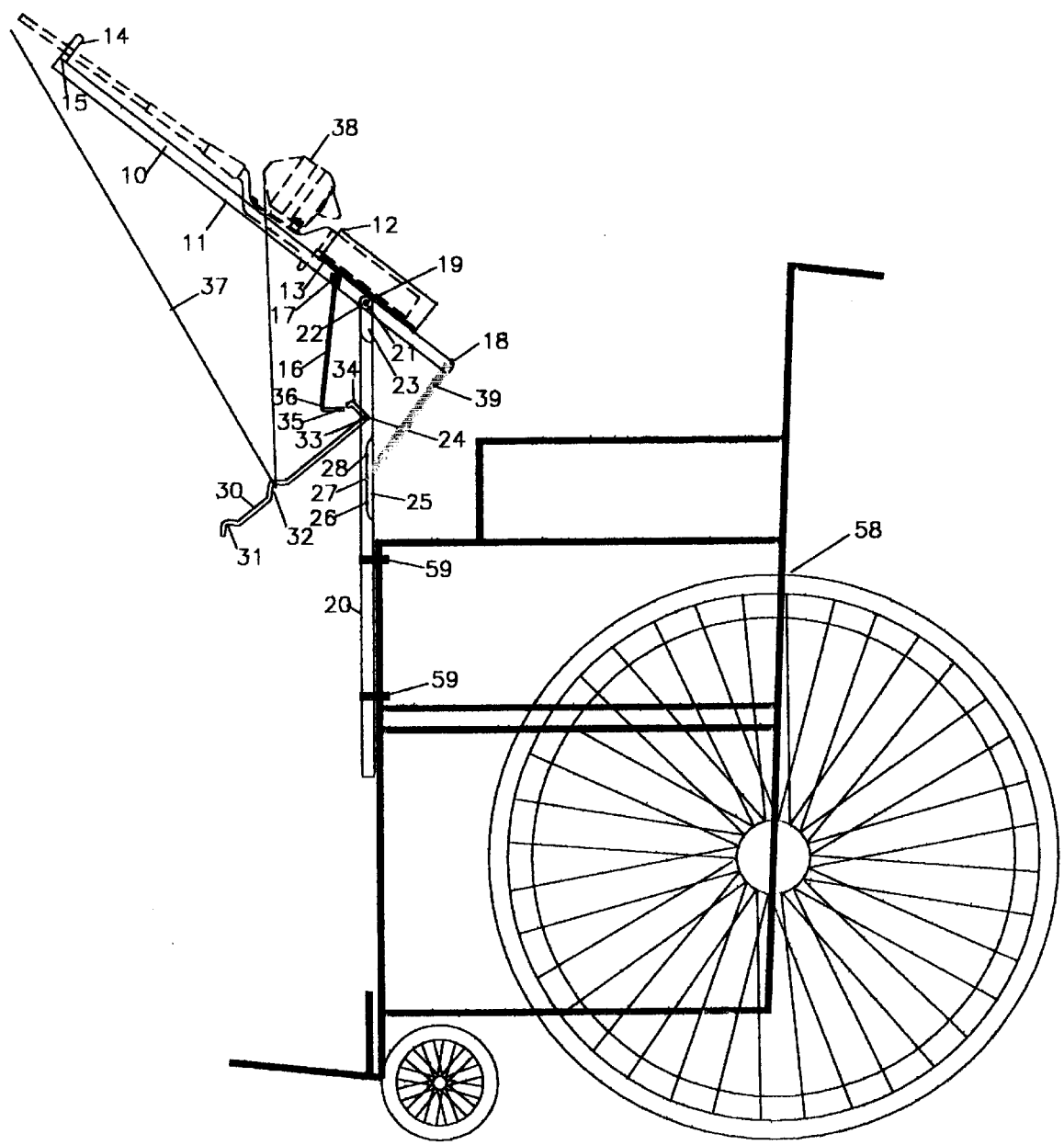
FIG. 4 is a side view of a rod and reel holder with automatic hook setter, with the stand clamped to a vertical frame member of a wheel chair using two hose clamps, shown immediately after a strike on the bait has raised the trigger lever to release the rod and reel holder and tackle to pivot in reaction to the spring tension.

As illustrated in FIGS. 1, 3 and 4 the rod and reel holder 10 is constructed of a ⅛ inch by ½ inch frame member 11, with a drilled 3/16 inch hole, pivot point 19 for mounting pivotally on the support stand 20 and a ⅛ inch drilled hole 18 for connecting to the tension spring 39. A U-shaped cradle 14 is welded 15 to the frame 11, at the end opposite spring connection hole 18. A tube with the ends flared 12 is welded 15 to the frame 11, centered above pivot point 19. Together the flared tube 12 and cradle 14 work to hold a wide variety of fishing tackle illustrated by rod and reel 38. It should be noted that the cradle 14 and flared tube and their protective coating protect the rod and reel 38 from scrapes or scarring damage during use. A ⅛ inch by ½ inch strip is formed for the catch release arm 16, and notched and welded 17 to the under side of frame 11. The catch release arm 16 has two contact points, a small bend 35 and fully seated in the bend 36 to couple with contact point 34 on trigger lever 30.

As illustrated in FIGS. 1–4, the support stand 20 is machined from a single piece of ½ inch steel rod. The upper end of the normally upright stand has a drilled 3/16-inch hole pivot point 21 for connecting pivotally to the rod and reel holder 10. A notch 23 is cut into the stand 20, on the same end as and perpendicular to pivot hole 21, to accept the rod and reel holder 10. A drilled 3/16 inch hole 24 accepts the trigger lever 30 and is drilled parallel to the pivot hole 21. Below the trigger lever pivot hole 24, three drilled ⅛-inch spring tension adjustment holes 26, 27, and 28 are spaced one inch apart for adjusting the tension in spring 39. Centered on spring tension adjustment holes 26–28, two ¼-inch deep by 3 and ½ inch long notches 25 are machined in the support stand 20. The notches 25 are machined on each side of a ⅛-inch strip of the rod, which is left, and together with the spring tension adjustment holes 26–28 accept the tension spring 39.

As illustrated in FIGS. 1–4 the trigger lever 30 is a round 3/16-inch rod with two bends, 31 and 32, formed to couple with the fishing line 37. As best seen in FIG. 2 the trigger lever 30 is further formed by bending at 33A and inserted through pivot hole 24 and then by bending at 33B so the contact point 34 on the end of trigger lever 30 can be coupled releasably with either of two contact points, notch 35 or bend 36 on catch release arm 16.

As illustrated in FIGS. 1, 2, and 3 the base adapter 50 is a three-inch piece of ½ inch inside diameter pipe 41 for accepting the bottom end of the support stand 20. FIG. 1 illustrates a bank fishing adapter 40 for the rod and reel holder with automatic hook setter wherein the base adapter pipe 41 is welded 42 to an elongated ½ inch square tube 45. A pointed extension 46 is welded 48 to the opposite end of tube 45. A piece of ½ inch square tubing 43 is welded 47 perpendicularly to tube 45, and together with another piece of ½ inch square tubing 44 welded 47, as a brace, angularly between tubing 43 and tubing 45, form a bracket for using foot pressure to set the bank fishing adapter 40 solidly in the ground. FIG. 2 illustrates the base adapter 50 configured for attaching to a wood dock 57. The pipe 41 is welded 42 to 3/16 inch by 1¼ inch by 3-inch base plate 51. Two drilled 3/16-inch holes 55 and two wood screws 54 are the means for securing this embodiment of the base adapter to the wood dock 57. FIG. 3 illustrates the base adapter 50 configured for attaching to boat railing 56. The pipe 41 is welded 42 to 3/16-inch by 1¼ inch by 3-inch base plate 51. Two 3/16 inch holes 55 are drilled in this base plate 51 and in a second matching base plate 52, and together with two bolts and self-locking nuts 53 clamp this embodiment of the base adapter to a boat railing 56. It should be noted there is no need to drill holes in the boat railing to secure the rod and reel holder with automatic hook setter to the railing.

FIG. 4 illustrates the use of the rod and reel holder with automatic hook setter with a wheel chair 58. In this configuration the support stand 20 is secured with two hose clamps 59 to a vertical frame member of wheel chair 58.

The assembly and setup of the rod and reel holder with automatic hook setter is accomplished with a 7/16 inch wrench and a Phillips screw driver and needle nose pliers. The rod and reel holder 10 frame 11 is placed in notch 23 of support stand 20. The pivot point 19 in frame 11 is aligned with the pivot point 21 in the support stand 20 and fastened in place with 3/16-inch pivot bolt and self-locking nut 22. Tension spring 39 is coupled with tension spring hole 18 in frame 11, and with one of three tension adjustment holes 26–28 in support stand 20. The tension spring 39 provides continuous force on the end of frame 11 which will cause the rod and reel holder 10 to rotate, around the pivot bolt 22, from the more horizontal position shown in FIG. 1 to the more vertical position shown in FIG. 3 which action, with the rod and reel in place, will set the fish hook at the end of the fishing line. The force with which this hook setting action takes place can be varied by choice of the tension adjustment hole 26–28. Use tension adjustment hole 26 for a harder hook setting snap and tension adjustment hole number 28 for a lesser snap.

One of the three embodiments of the base adapter is installed as shown in FIGS. 1, 2 or 3 and the bottom of support stand 20 is placed in the chosen base adapter 50; or alternatively the support stand 20 may be clamped to a wheel chair 58 vertical frame member, or similar support, with two hosed clamps 59 such as is illustrated in FIG. 4.

After set up of the rod and reel holder with automatic hook setter, use and various adjustments are accomplished as follows. The rod and reel holder 10 is placed in the "cocked" position by rotating it around pivot bolt 22 in opposition to the tension spring 39 and coupling the contact point 34 on the trigger lever 30 with one of the contact points, bend 35 or bend 36, on the catch release arm 16. The coupling point can be changed by pushing and slightly bending the catch release arm 16 either forward or backward. When contact point bend 35 is used a lesser rotation of trigger lever 30 will be required for release, and when contact point bend 36 is used, a greater rotation will be required. The baited hook or lure is cast and the rod and reel 38 is laid in the rod and reel holder 10 by placing the rod handle inside the flared tube 12 and laying the rod in cradle 14. The fishing line 37 is looped under the trigger lever 30 at either notch 31 or 32, and the slack is taken out of the fishing line. When a strike on the bait is detected by a pull on the fishing line 37, of sufficient force, the trigger lever 30 will rotate in pivot hole 24 and release the catch release arm. The rod and reel holder 10 together with the rod and reel 38 will snap back setting the hook. When the fishing line 37 is coupled with the trigger lever 30 at bend 32 a strike of greater force will be required to rotate the trigger lever 30 in pivot hole 24 to the point of releasing the catch release arm. When the fishing line 37 is coupled with the trigger lever 30 at bend 31 a strike of lesser force will be required.

As can be seen a wide range of configurations and adjustments are available for use of the rod and reel holder with automatic hook setter in a variety of situations, and for catching a variety of fish.

I claim:

1. A fishing rod and reel holder comprising:

a frame having a front end, a rear end, and an intermediate portion therebetween, the front end having a U-shaped cradle welded thereto, the intermediate portion having a tube with first and second ends which are flared outwardly, the tube being welded along its length to the intermediate portion;

a vertical support member having a top end, a bottom end, and an intermediate portion therebetween, the top end being pivotally attached to the intermediate portion of the frame below a middle portion of the tube, the intermediate portion of the vertical support having a plurality of vertically aligned holes, the bottom end being configured to secure the rod and reel holder to a support surface;

a catch release comprising a first end welded to the frame below the first end of the tube and forward of the vertical support member, a straight portion extending from the first end of the release, a terminal end having a bend, and a middle bend connecting the straight portion with the terminal end;

a trigger lever having a first end, an intermediate portion, and a second end, the intermediate portion of the lever extending through the intermediate portion of the vertical support member above the plurality of vertically aligned holes so as to pivotally connect the lever to the vertical support member, the first end of the lever comprising a contact point for releasibly coupling with one of the terminal end and middle bend of the catch release, the intermediate portion of the lever having at least one bend for retaining a portion of fishing line, the second end of the lever having a terminal bend for retaining a portion of fishing line;

a tension spring having first and second ends, the first end of the spring being attached to the second end of the frame, the second end of the spring being attached to one of the plurality of vertically aligned holes on the intermediate portion of the vertical support so as to adjust the tension of the spring, wherein a highest hole of the plurality of vertically aligned holes provides the least amount of tension and a lowest hole of the plurality of vertically aligned holes provides the greatest amount of tension;

wherein either the terminal end and middle bend of the catch release is engaged with the contact point of the first end of the lever and a portion of fishing line is engaged with either the at least one bend of the intermediate portion of the lever or the terminal bend of the second end of the lever, and when a fish strikes the fishing line, the trigger lever being moved upwards by the fishing line which releases the catch release from the contact point of the first end of the trigger lever and the spring causes the frame to pivot upwards.

2. The fishing rod and reel holder of claim 1 further comprising a holding base for receiving the bottom end of the vertical support member which is welded to a base plate, the base plate capable of being secured to the support surface by fasteners.

3. The fishing rod and reel holder of claim 2 wherein the support surface is a boat railing and the fasteners comprise bolts.

4. The fishing rod and reel holder of claim 2 wherein the support surface is a dock plank and the fasteners comprise screws.

* * * * *